U̇nited States Patent Office 2,754,256
Patented July 10, 1956

2,754,256
PROCESS FOR PURIFYING TITANIUM TETRACHLORIDE

Edgel P. Stambaugh, Metuchen, N. J., assignor to National Lead Company, New York, N. Y., a corporation of New Jersey No Drawing. Application April 24, 1953,
Serial No. 351,028

9 Claims. (Cl. 202—57)

The present invention relates in general to the preparation of the tetrahalides of metals of the fourth group of elements and more especially to the purification of titanium tetrachloride and similar stable normally liquid distillable tetrahalides.

In general the tetrahalides of metals of the fourth group of elements are prepared by chlorinating a metal-bearing material and recovering the metal from the tetrachloride vapor in the form of a relatively impure liquid condensate. By way of example, liquid titanium tetrachloride is commonly prepared by treating a titaniferous material such as titaniferous iron ore, or ilmenite with chlorine gas, in a static bed or fluo-solids operation, to form titanium tetrachloride vapor which is subsequently condensed to form a crude titanium tetrachloride condensate. Since there are a number of elements in the raw material, in addition to titanium, which react with chlorine to form volatile chlorides and which carry over with the titanium tetrachloride vapors, the titanium tetrachloride condensate, sometimes hereinafter referred to as crude titanium tetrachloride, is invariably impure. Moreover, it has been found that these volatile chlorides are not readily eliminated by distillation since the respective chlorides such as, for example, the chlorides of silicon, aluminum, niobium, tungsten and vanadium, tend to distill over with the titanium tetrachloride values and to be found in the condensate. One such impurity which, because of the proximity of its boiling point to that of titanium tetrachloride, cannot be separated therefrom by fractional distillation is vanadium chloride. Vanadium chloride is present in substantially all crude titanium tetrachloride condensate and comprises a major portion of the impurities in the condensate and hence is chiefly responsible for the yellowish color of crude titanium tetrachloride. By way of example, a typical crude titanium tetrachloride may comprise from 0.25 to 0.35% vanadium based on the weight of the titanium tetrachloride, the other impurities being present in relatively small amounts such as, for example, from 0.04 to 0.2% silica, from 0.02 to 0.025% alumina, from 0.01 to 0.02% niobium, and from 0.05 to 0.08% tungsten.

While it has been proposed heretofore to purify crude titanium tetrachloride and other similar tetrahalides by treatment with such materials as hydrogen sulphide, silica gel, carbon, salts of the heavy metals, soya bean oil, art gum, etc., such methods have been characterized by the formation of residues which have been either insoluble or removable from the still bottoms only with the greatest difficulty. As a consequence the adaptation to commercial production of prior methods for purifying crude titanium tetrachloride have been attended by much difficulty and high cost.

An object of the present invention is, therefore, to provide a superior method for producing substantially pure liquid tetrahalides of the fourth group of elements.

A further object of the invention is to provide a superior method for purifying crude titanium tetrachloride which is convenient, economical and adaptable to commercial production.

A still further object of the invention is to provide a superior method for removing a major portion of the impurities from crude titanium tetrachloride in a manner such that no polymerization occurs and the residue formed may be readily removed from the still.

These and other objects will become more apparent from the following more complete description of the instant invention.

In its broadest aspects the present invention relates to a process for producing substantially pure liquid titanium tetrachloride by admixing crude titanium tetrachloride and a liquid chlorinated hydrocarbon of the methane series containing at least 5 carbon atoms and at least one chlorine atom per molecule and heating the mixture from 65° C. to boiling point of said mixture and separating the purified titanium tetrachloride therefrom.

As used herein, the term "Chlorinated hydrocarbons of the methane series" includes all saturated hydrocarbons having at least 5 carbon atoms per molecule and chlorinated paraffins including polyvinyl chlorides. Only the chlorinated hydrocarbons of the methane series which are liquid at room temperature are contemplated by the instant invention. The purifying agent must contain at least 5 carbon atoms and at least 1 chlorine atom per molecule. Those compounds which are most satisfactory for purification and which are liquid usually contain from about 5% to about 60% chlorine by weight. These liquid chlorinated hydrocarbons are saturated and therefore contain no double or triple bonds. These saturated compounds therefore do not polymerize in the titanium tetrachloride and therefore are desirable as a purifying agent.

The treatment of crude titanium tetrachloride, by which is meant a liquid titanium tetrachloride containing such impurities as vanadium, silica, alumina, niobium, tungsten and the like, with chlorinated hydrocarbons may be carried out, according to the present invention, in any convenient manner which will insure the required intimacy of contact between the crude titanium tetrachloride and the purifying agent. The purification treatment may be carried out in a purification unit comprising, for example, a still having a fractionating column, a reflux return and a condenser, by heating the crude titanium tetrachloride with a chlorinated hydrocarbon in the still at a temperature from 65° C. to boiling point of the mixture and thereafter separating the treated titanium tetrachloride by distilling and condensing the purified titanium tetrachloride. The purification treatment may also be carried out in a vessel by heating the mixture at a temperature between 65° C. and the boiling point of the mixture and filtering the heat-treated mixture to obtain the purified titanium tetrachloride as the filtrate. In using liquid chlorinated hydrocarbons as purification agents it has been found that purified titanium tetrachloride may be recovered from the mixture by either the distillation or filtration method described above.

The chemical reaction which takes place between the purifying agent and the titanium tetrachloride is not completely understood. The purifying agents contemplated by the instant invention, that is, the liquid chlorinated hydrocarbons are apparently soluble in the titanium tetrachloride and only a very small residue or reaction product is formed. This residue, however, apparently is finely divided and remains suspended in the titanium tetrachloride during the heat treatment.

The type of residue which forms in the instant invention is entirely different from that obtained when employing organic compounds which polymerize and form bulky and sticky still bottoms which are difficult to handle. When the chlorinated hydrocarbons are employed, however, only very small amount of suspended residues are obtained which can be concentrated and filtered from time to time and therefore still bottom difficulties are eliminated. The total amount of residue formed in the vessel is usually less than about 1% of the total volume of titanium tetrachloride used.

The amount of chlorinated hydrocarbon used as a purifying agent is dependent upon the amount of impurities and particularly the amount of vanadium present in the crude titanium tetrachloride and upon the time and temperature of the treatment employed. It has been found that from about 0.01% to about 1% should be employed to remove substantially all of the vanadium from the crude titanium tetrachloride. The amount of agent will vary according to the vanadium content present in the crude material. In most cases this amount will vary from approximately 0.04 to 0.5% V in the crude titanium tetrachloride. The smaller amounts of purifying agent may be employed for purifying the crude titanium tetrachloride which contains the smaller amounts of vanadium. The smaller amounts, that is, below about 0.1% may be employed when the treatment is made at substantially boiling temperatures. When operating at temperatures below boiling, it is necessary to increase the amount of purifying agent employed until the larger amounts are used at the lower treatment temperatures. With respect to the time of treatment it is necessary to lengthen the time as lower temperature treatments are employed. For illustration purposes the following comparison is presented. With a crude titanium tetrachloride which contains 0.4% V, the time of treatment is only a few minutes at the boiling temperature, approximately 1 hour at 120° C., 2 hours at 95° C., 3 hours at 85° C., and 12 to 18 hours at 65° C. In this particular instance, the amount of purifying agent was varied from .1% to 1.0%, as the temperature was lowered in each successive run. In the case of treating a crude titanium tetrachloride which contains 0.04% vanadium, it was desirable to use purifying agents in amount of 0.01% to 0.1% as the temperature of treatment was lowered. In each of the above cases the vanadium content in the purified titanium tetrachloride fell within the range of from about 0.0001% to 0.0003% by weight of the titanium tetrachloride and the remaining impurities in the titanium tetrachloride were present in such small quantities as to be innocuous.

If the crude titanium tetrachloride contains considerable amount of sludge it is necessary to add somewhat more of the purifying agent than that described above.

In carrying out the treatment of the crude titanium tetrachloride with a liquid chlorinated hydrocarbon the chlorinated hydrocarbon is usually added to crude titanium tetrachloride at substantially room temperature whereupon the mixture is heated to a temperature of from about 65° C. to the boiling point of the mixture for a period of time ranging from a minute or two to about 20 hours, depending upon the temperature of heat treatment, after which the pure titanium tetrachloride is either distilled and condensed or filtered from the mixture. For economical reasons a minimum amount of chlorinated hydrocarbon for effecting substantially complete purification of the crude titanium tetrachloride is preferred. However, as the amount of purifying compound added to the crude titanium tetrachloride is increased the time required for heat treating the admixture of crude titanium tetrachloride and the purifying agent is decreased.

The following examples are illustrative.

Example 1

To 1000 parts of crude titanium tetrachloride (containing 0.35% V) at substantially room temperature was added 1 part of chlorinated paraffin containing 42% chlorine by weight and the mixture was refluxed at a temperature of about 136° C. for a period of 15 minutes. The treated mixture was then distilled and a substantially pure titanium tetrachloride condensate was secured. The vanadium content of the pure titanium tetrachloride was 0.0003% V. An extremely small amount of residue was formed in the still. This residue was held in suspension and did not form a sticky or bulky still bottom. The residue when dried had a volume of less than 1% of the total volume of the titanium tetrachloride used.

Example 2

To 100 parts of the same crude titanium tetrachloride at substantially room temperature was added 0.1 part of chlorinated paraffin containing 50% chlorine by weight whereupon the mixture was refluxed at a temperature of about 136° C. for a period of 15 minutes. The treated mixture was then distilled and yielded a substantially pure titanium tetrachloride. The vanadium content of the pure titanium tetrachloride was 0.0003% V.

Example 3

The same procedure was used to purify crude titanium tetrachloride except that a polyvinyl chloride was used and substantially identical results were obtained.

Example 4

To 100 parts of the same crude titanium tetrachloride were added 0.3 part of chlorinated paraffin containing 42% chlorine whereupon the mixture was heated to 120° C. and held at that temperature for a period of 1 hour. The solution was then filtered and a substantially pure titanium tetrachloride which contained 0.0003% V was obtained as the filtrate.

Example 5

The same procedure as that described in Example 4 was used except that 0.5% of the purifying agent was employed and the mixture was heat-treated for 3 hours at 85° C. Upon filtering, substantially identical results were obtained.

Example 6

The procedure used in Example 4 was followed except that 0.5% of the purifying agent was employed and that the mixture was heat-treated at 65° C. for 18 hours. Again similar results were obtained upon filtration.

Example 7

In this example the same procedure used in Example 1 was employed except that 0.5% of dichloropentane was employed in place of the chlorinated paraffin. Again substantially identical results to those described in Example 1 were obtained.

Example 8

The same procedure used in Example 1 was employed except that 0.5% lauryl chloride was used in place of the chlorinated paraffin and substantially identical results were obtained.

Example 9

Employing 0.5% cetyl chloride in place of the chlorinated paraffin again produced substantially identical results.

By the process of this invention, crude titanium tetrachloride which contained impurities, particularly vanadium, may be purified by treating the crude titanium tetrachloride in the presence of a small quantity of liquid chlorinated hydrocarbon and a substantially pure titanium tetrachloride may be obtained. The heat treatment may be carried out at temperatures from about 65° C. to the boiling point of the mixture. The purified titanium tetrachloride may be recovered from the mixture by either distillation or filtration. The process is simple and economical to operate and is particularly adaptable for commercial production. By employing the particular type of purifying agent contemplated in the instant invention only a very small amount of residue is formed and this residue remains suspended in the titanium tetrachloride and therefore does not present any difficulty in removal from the still, which is a decided improvement over residues which form voluminous and sticky still bottoms. These particular types of agent apparently do not form polymers and therefore do not result in bulky masses which are extremely difficult to handle. The small amounts of residues which are formed by using liquid chlorinated hydrocarbons according to the instant invention and which are suspended in the mixture may be removed with ease by filtration or other convenient manner and the filtrates returned to the still if desired. Such methods of removal are substantially impossible with bulky or sticky residues.

While this invention has been described and illustrated by the examples shown, it is not intended that it be limited thereto, and other modifications and variations may be employed within the scope of the following claims.

I claim:

1. Process for purifying crude titanium tetrachloride by removing a major portion of the vanadium therefrom which comprises admixing crude titanium tetrachloride and liquid chlorinated aliphatic hydrocarbon containing at least 5 carbon atoms and at least 1 chlorine atom per molecule and subsequently heating the mixture of said crude titanium tetrachloride and liquid chlorinated aliphatic hydrocarbon at a temperature of from about 65° C. to boiling point of said mixture and removing from said mixture the purified titanium tetrachloride.

2. Process according to claim 1 in which the purified titanium tetrachloride is removed by distillation.

3. Process according to claim 1 in which the purified titanium tetrachloride is removed by filtration.

4. Process according to claim 1 in which the liquid chlorinated aliphatic hydrocarbon contains from about 5% to about 60% chlorine by weight.

5. Process according to claim 1 in which the chlorinated aliphatic hydrocarbon is chlorinated paraffin.

6. Process according to claim 1 in which the chlorinated aliphatic hydrocarbon is polyvinyl chloride.

7. Process according to claim 1 in which the chlorinated aliphatic hydrocarbon is dichloropentane.

8. Process according to claim 1 in which the chlorinated aliphatic hydrocarbon is lauryl chloride.

9. Process according to claim 1 in which the chlorinated aliphatic hydrocarbon is cetyl chloride.

References Cited in the file of this patent

UNITED STATES PATENTS 2,592,021    Frey et al. _____ Apr. 8, 1952

OTHER REFERENCES

Mellor's "Inorg. and Theoretical Chem.," vol. 7, 1927 ed., page 82; Longmans, Green and Co., N. Y.

"Titanium" by J. Barksdale, 1949 ed., page 106; Ronald Press Co., N. Y.